United States Patent [19]

Yagi

[11] Patent Number: 5,010,732
[45] Date of Patent: Apr. 30, 1991

[54] HYDRAULIC PRESSURE BOOSTER WITH A RESTRICTOR PRODUCING A BRAKING SENSATION

[75] Inventor: Isao Yagi, Saitama, Japan

[73] Assignee: Jidosha Kiki Co., Ltd., Tokyo, Japan

[21] Appl. No.: 347,494

[22] Filed: May 4, 1989

[30] Foreign Application Priority Data

May 19, 1988 [JP] Japan ................. 63-122275

[51] Int. Cl.$^5$ ............................ F16D 31/02
[52] U.S. Cl. ..................... 60/413; 60/547.1; 91/368; 91/441
[58] Field of Search .......... 91/368, 369.2, 170, 91/172, 443, 441, 369.1; 92/61, 62; 60/547.1, 413

[56] References Cited

U.S. PATENT DOCUMENTS

| | | | |
|---|---|---|---|
| 3,376,703 | 4/1968 | Buczynski | 60/464 X |
| 3,958,493 | 5/1976 | Fujita et al. | 92/62 X |
| 4,050,251 | 9/1977 | Carre et al. | 92/62 X |
| 4,196,592 | 4/1980 | Nomura et al. | 60/547.1 |
| 4,223,533 | 9/1980 | Valentin | 60/548 X |
| 4,253,379 | 3/1981 | Olson | 91/443 |
| 4,341,076 | 7/1982 | Steffes | 60/547.1 |
| 4,362,086 | 12/1982 | Runkle | 60/547.1 X |
| 4,625,623 | 12/1986 | Lohraff | 91/368 |
| 4,656,923 | 4/1987 | Tsuyuki et al. | 91/369 R |
| 4,706,546 | 11/1987 | Inoue et al. | 91/370 |
| 4,940,290 | 7/1990 | Nishii et al. | 60/547.1 X |

FOREIGN PATENT DOCUMENTS 2902248 7/1980 Fed. Rep. of Germany ........ 91/443
61-71270 4/1986 Japan.

Primary Examiner—John T. Kwon
Assistant Examiner—John Ryznic
Attorney, Agent, or Firm—Flynn, Thiel, Boutell & Tanis

[57] ABSTRACT

A hydraulic pressure booster which may be used in a brake system of a vehicle is constructed to allow a brake output to be increased upon ceasing the depression of a brake pedal, thus imparting a brake feeling which is favorable to a driver. Hydraulic pressure from a first power chamber flows into a second power chamber through a passage provided with an orifice in shunt with a check valve, such that flow from the first power chamber to the second power chamber is retarded while flow from the second power chamber to the first power chamber is unrestricted.

4 Claims, 2 Drawing Sheets

HYDRAULIC PRESSURE BOOSTER WITH A RESTRICTOR PRODUCING A BRAKING SENSATION

FIELD OF THE INVENTION

The invention relates to a hydraulic pressure booster which is used in a braking system of a vehicle.

DESCRIPTION OF THE PRIOR ART

A hydraulic pressure booster generally comprises a piston which is fitted in a housing so as to be reciprocable, a power chamber formed in an end of the piston, and a control valve adapted to be operated, as a result of a mechanical connection with an input shaft, for introducing an hydraulic pressure into the power chamber having a magnitude which depends on the magnitude of an input applied to the input shaft to thereby drive the piston forward.

On the other hand, a type of hydraulic pressure booster is also known (see Japanese Laid-Open patent application No. 71,270/1986) comprising a first piston of a smaller diameter and a second piston of a greater diameter which are both fitted in a housing so as to be reciprocable in a common direction and which are disposed in abutment against each other, a first power chamber formed in one free end of the first piston, a second power chamber formed in the other end of the first piston which is disposed in abutment against the second piston, a control valve adapted to be operated as a result of a mechanical connection with an input shaft for introducing a hydraulic pressure into the first power chamber having a magnitude which depends on the magnitude of an input applied to the input shaft to thereby drive the first piston forward, and a flow path switching valve for selectively communicating the second power chamber with the first power chamber or a reservoir.

In the operation of this hydraulic pressure booster, when the second power chamber communicates with the reservoir, the hydraulic pressure is introduced only into the first power chamber, whereby the forward drive applied to the first piston of a smaller diameter is effective in providing a braking action. By contrast, when the second power chamber communicates with the first power chamber, the hydraulic pressure is applied to the second piston of a greater diameter, whereby the forward drive of a greater magnitude applied to the second piston is effective in providing a braking action, thus allowing a boosting ratio of the hydraulic pressure booster to be changed.

It is recognized from the experience that a brake feeling which is favorable to a driver can be imparted upon actuating a brake if a braking output is allowed to increase slightly beyond a value which is obtained when a brake pedal ceases to be depressed. However, in either arrangement of hydraulic pressure booster mentioned above, the brake output remains to be a constant value which is reached upon ceasing the depression of the brake pedal, and it has been impossible to allow such output to be increased.

SUMMARY OF THE INVENTION

In view of the foregoing, the present invention allows a brake output to be increased beyond a value which is reached upon ceasing the depression of a brake pedal while utilizing an arrangement of a conventional hydraulic pressure booster, in particular, of the latter type mentioned above.

Specifically, the invention relates to a hydraulic pressure booster comprising a first piston of a smaller diameter and a second piston of a greater diameter which are disposed in a housing so as to be reciprocable in a common direction and which are disposed in abutment against each other, a first power chamber formed in one free end of the first piston, a second power chamber formed in the other end of the first piston which is disposed in abutment against the second piston, a communication passage providing a communication between the first and the second power chamber, and a control valve adapted to be operated as a result of a mechanical connection with an input shaft for introducing a hydraulic pressure into the first power chamber having a magnitude which depends on the magnitude of an input applied to the input shaft to drive the first piston forward, an arrangement being provided so that the hydraulic pressure which is introduced into the first power chamber may be introduced into the second power chamber through the communication passage. In accordance with the invention, there are provided an orifice which retards the introduction of the hydraulic pressure from the first to the second power chamber, and a check valve which permits a flow of the hydraulic pressure from the second to the first power chamber.

With the arrangement of the invention, the introduction of the hydraulic pressure from the first to the second power chamber is retarded by the presence of the orifice, and accordingly, an output which is obtained at the moment when the brake pedal ceases to be depressed under an intermediate load condition results from the first piston of a smaller diameter, but after a retardation period passes to allow the hydraulic pressure within the second power chamber to reach the same value as that in the first power chamber, the output increases to a value which results from the second piston of a greater diameter. In this manner, a favorable brake feeling as mentioned can be obtained.

Above and other objects, features and advantages of the invention will become apparent from the following description of an embodiment thereof with reference to the attached drawings.

DETAILED DESCRIPTION OF EMBODIMENT

Figure 1:
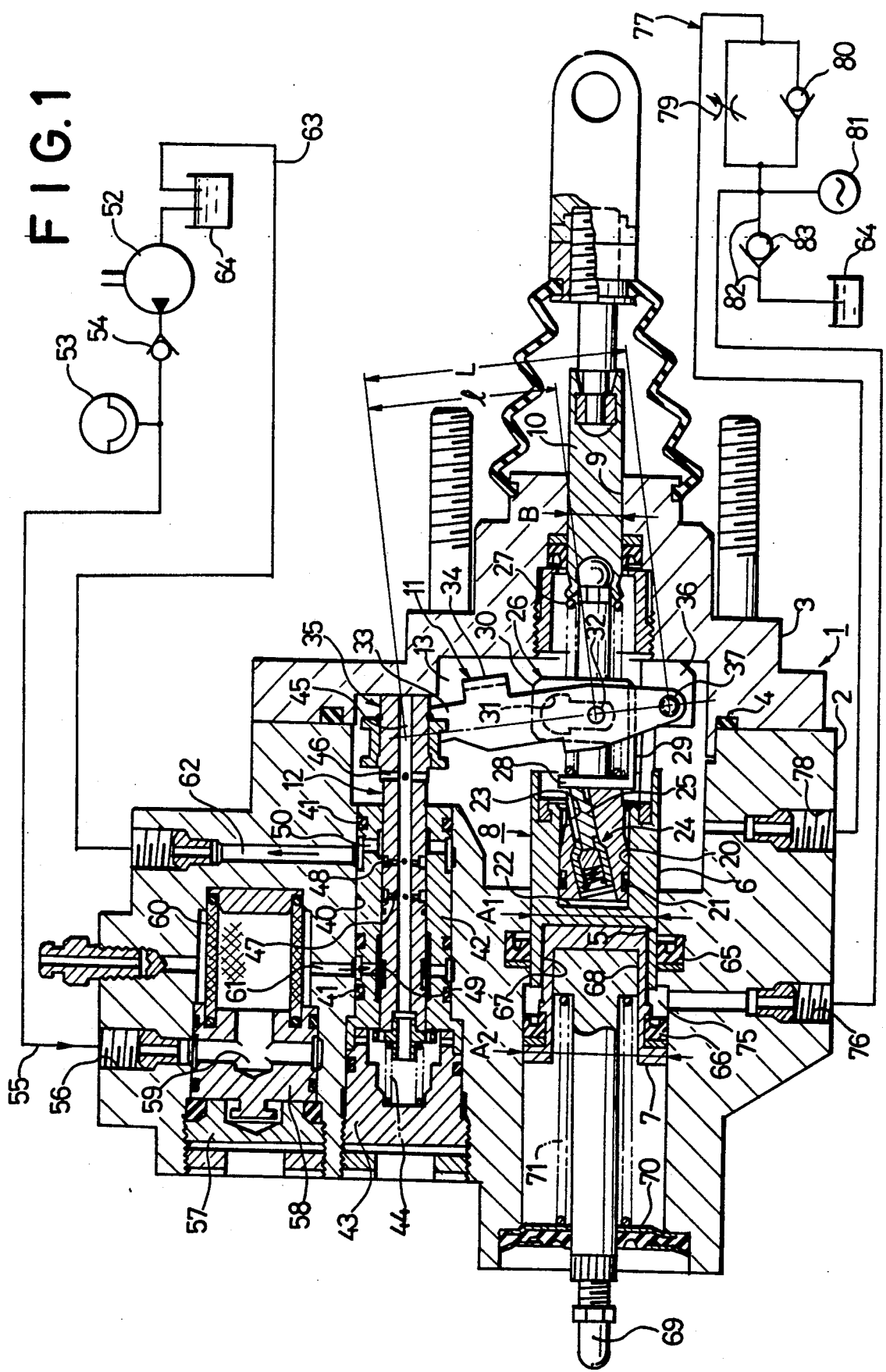
FIG. 1 is a longitudinal section of an embodiment of the invention together with a schematic view of associated parts.

Referring to the drawings, an embodiment of the invention will now be described. Referring to FIG. 1 initially, a hydraulic pressure booster includes a housing 1 formed by a body 2 and a cover 3, which are fastened together by bolts, not shown, with a seal member 4 interposed therebetween to maintain a liquid tightness.

The body 2 is formed with a stepped bore 5 in which a stepped power piston 8 including a first piston 6 of a smaller diameter and a second piston 7 of a greater diameter is slidably fitted. An opening 9 is formed in the cover 3 in axial alignment with the bore 5 and has an input shaft 10, mechanically coupled to a brake pedal, not shown, slidably fitted therein.

The input shaft 10 is mechanically coupled to the power piston 8, and is also coupled through a lever 11 to a control valve 12, to be described later, which operates to introduce a hydraulic pressure dependent on the magnitude of an input applied to the input shaft 10 into a first power chamber 13 defined between the body 2 and the cover 3, allowing the power piston 8 to be driven forward or to the left, as viewed in FIG. 1, in accordance with such hydraulic pressure.

The inner end of the input shaft 10 is slidably fitted into an opening 20 having a closed bottom which is formed in the right end of the power piston 8 in axial alignment therewith, with a seal member 21 interposed therebetween to maintain in a liquid tightness. A pressure chamber 22 is defined within the opening 20. A passage 23 is formed to extend through the input shaft 10 to communicate the pressure chamber 22 with the first power chamber 13, and a check valve 24 is disposed within the passage 23 which allows a flow of a pressure fluid only in a direction from the first power chamber 13 into the pressure chamber 22.

The check valve 24 is coupled to one end of a pin 25 which is loosely fitted into the passage 23. The other end of the pin 25 abuts against a bracket 26 which is slidably fitted over the outer periphery of the input shaft 10. The bracket 26 is normally urged to a position shown where it bears against a step formed in the input shaft 10 by means of a spring 27 which is disposed between the bracket and the input shaft 10. When the bracket assumes this condition, the check valve 24 is held in its open position by the pin 25, allowing a communication between the pressure chamber 22 and the first power chamber 13.

The bracket 26 includes a base 28 which is adapted to abut against the pin and which allows the input shaft 10 to slidably extend therethrough, an axial section 29 which extends axially to the right from the bottom of the base 28, and a channel-shaped section 30 including a pair of limbs extending upwardly from the opposite sides of the axial section 29 at its right end and extending on the opposite sides of the input shaft 10. Each limb of the channel-shaped section 30 is formed with an elongate slot 31, which is engaged by a pin 32 fixedly mounted on the lever 11.

The lever 11 acts as a coupling between the input shaft 10 and the control valve 12 and also between the power piston 8 and the control valve 12. Specifically, the lever 11 includes a pair of parallel sections 33 which extend parallel to each other and which are disposed to surround the both limbs of the channel-shaped section 30 extending upwardly from the axial section 29 of the bracket 26, and a connector 34 which integrally fastens the both parallel sections 33 together. The pin 32 are fixedly mounted on the inside of each parallel section 33 and are engaged with the elongate slots 31 formed in the limbs of the bracket 26, thus coupling an intermediate portion of the lever 11 with the input shaft 10.

One end of the lever 11 is coupled to a spool 35 through an engagement between a lengthwise elongate groove formed in the lever, not shown, and a pin, not shown, mounted on the spool 35 of the control valve 12 while the other end of the lever 11 is mechanically coupled to the power piston 8 by having a pin 37 mounted thereon pivotally mounted on a bracket 36 which is integrally connected to the right end of the power piston 8.

The control valve 12 includes an opening 40 extending through the body 2 and having its one end communicating with the first power chamber 13, a sleeve 42 fitted into the opening 40 with a plurality of seal members 41 provided therearound, and a plug 43 threadably engaged with the body 2 to secure the sleeve 42 to the housing 1 and also sealingly closing the other end of the opening 40. The spool 35 is slidably fitted in the sleeve 40. A spring 44 is disposed between the spool 35 and the plug 43, whereby the spool 35 is normally maintained in its inoperative position, shown, whereby its outer end bears against the cover 3. Under this condition, the resilience of the spring 44 is chosen to be less than the resilience of the spring 27 which urges the bracket 26.

An axial passage 45 extends through the spool 35 in axial alignment therewith, and the combination of the axial passage 45 and a radial passage 46 which is formed in the right end of the spool 35 is effective to maintain the axial passage 45 in communication with the first power chamber 13. Intermediate its length, the spool 35 is formed with a pair of radial passages 47, 48 which are spaced apart by a given spacing while a supply passage 49 and an exhaust passage 50, which supplies or exhausts a pressure fluid to or from the axial passage 45 are formed in the sleeve 42 at locations on opposite sides of the radial passages 47, 48.

A pump 52 or an accumulator 53 supplies a pressure fluid to the supply passage 49. Specifically, the hydraulic pressure discharged from the pump 52 is fed through a check valve 54 to the accumulator 53, and the accumulated pressure fluid is then supplied to the supply passage 49 through a conduit 55, a passage 56 formed in the body 2, a passage 59 formed in a disc member 58 which is held in place by a plug 57 which is threadably engaged with the body 2, a filter 60 and a passage 61 formed in the body 2. The filter 60 is formed by a sintered metal into a hollow cylindrical configuration, and secured in place within the body 2 by the plug 57 with the disc member 58 interposed therebetween.

On the other hand, the exhaust passage 50 communicates with a reservoir 64 associated with the pump 52 through a passage 62 formed in the body 2 and a conduit 63. When the spool 35 assumes its inoperative position, shown, a communication between the left-hand radial passage 47 formed in the spool 35 and the supply passage 49 is interrupted while the right-hand radial passage 48 formed in the spool 35 communicates with the exhaust passage 50, whereby the first power chamber 13 communicates with the reservoir 64 in the inoperative position shown.

The first piston 6 and the second piston 7 having a greater diameter than the piston 6, both of which constitute together the power piston 8, are slidably fitted in the stepped bore 5 with seal members 65, 66 disposed to maintain a liquid tightness At its right end, the second piston 7 includes a portion of a reduced diameter, which is loosely fitted in an opening 67 formed in the left end of the first piston 6, with the both pistons 6, 7 being disposed in abutment against each other.

At its left end, the second piston 7 is formed with an opening 68, into which the right end of an output shaft 69 is fitted, with a spring 71 disposed between the right end of the output shaft 69 and a retainer 70 which is fitted in the left end of the stepped bore 5, thus integrally urging the output shaft 69, the second piston 7 and the first piston 6 to the right, whereby these members normally assume their inoperative positions shown. It is to be noted that the resilience of the spring 71 is chosen to be greater than the resilience of the spring 27 which urges the bracket 26. The output shaft 69 extends through the retainer 70 to be connected to a piston of a master cylinder, not shown.

A second power chamber 75 is defined between the first piston 6 and the second piston 7 in the stepped bore 5, and communicates with the first power chamber 13 through a passage 76 formed in the body 2, a communication passage 77 which continues from the passage 76 and another passage 78 formed in the body 2. An orifice 79 and a check valve 80 which permits a flow of the pressure fluid from the second power chamber 75 to the first power chamber 13 are disposed in shunt with each other within the communication passage 77.

Accordingly, since the hydraulic pressure is fed from the first power chamber 13 to the second power chamber 75 through the orifice 79, the introduction of the hydraulic pressure into the second power chamber 75 will be retarded with respect to the introduction of the pressure fluid into the first power chamber 13. By contrast, the exhaust of the hydraulic pressure from the second power chamber 75 to the first power chamber 13 takes place through the check valve 80, and therefore occurs immediately.

In the present embodiment, an accumulator 81 is connected to the communication passage 77 at a location nearer the second power chamber 75 than the orifice 79 and the check valve 80, and the reservoir 64 communicates with the communication passage 77 at this point through a conduit 82 and a check valve 83.

In effect, the accumulator 81 functions to increase the volume of the second power chamber 75, thus allowing an increase in the hydraulic pressure which is introduced into the second power chamber 75 from the first power chamber 13 to be retarded to a greater degree. The check valve 83 allows a flow of the fluid from the reservoir 64 to the communication passage 77, thus allowing the fluid supply from the reservoir 64 in the event the second power chamber 75 assumes a negative pressure for some reason.

In the described arrangement, when a brake pedal is now depressed under the inoperative condition shown to drive the input shaft 10 to the left, the bracket 26 which is fixed with respect to the input shaft 10 by means of the spring 27 moves to the left together with the input shaft 10. The spring 71 having a greater resilience than the spring 27 then maintains the power piston 8 in its inoperative position shown, but because the resilience of the spring 44 which urges the spool 35 of the control valve 12 is less than the resilience of the spring 27, the lever 11 will rotate counter-clockwise about the pin 37 on the bracket 36 which is integral with the power piston 8, thereby causing the spool 35 to be displaced to the left.

Thereupon, a communication between the radial passage 48 formed in the spool 35 and the exhaust passage 50 formed in the sleeve 42 is interrupted, while a communication is established between the other radial passage 47 and the supply passage 49, thus allowing the pressure fluid which has been introduced into the supply passage 49 to be introduced into the first power chamber 13 through the radial passage 47, axial passage 45 and the radial passage 46. The pressure fluid is also fed to the left side of the spool 35 through the axial passage 45, thus preventing the spool 35 from being driven to the left as a result of the pressure fluid which has been introduced into the first power chamber 13.

When the pressure fluid is introduced into the first power chamber 13, such pressure fluid acts to drive the first piston 6 of a smaller diameter to the left against the resilience of the spring 71, allowing the lever 11 to drive the spool 35 to the right As a consequence, the hydraulic pressure introduced into the first chamber 13 is controlled in accordance with the magnitude of an input applied to the input shaft 10 or the degree of depression of the brake pedal, generally in the same manner as in a conventional hydraulic pressure booster.

Figure 2:
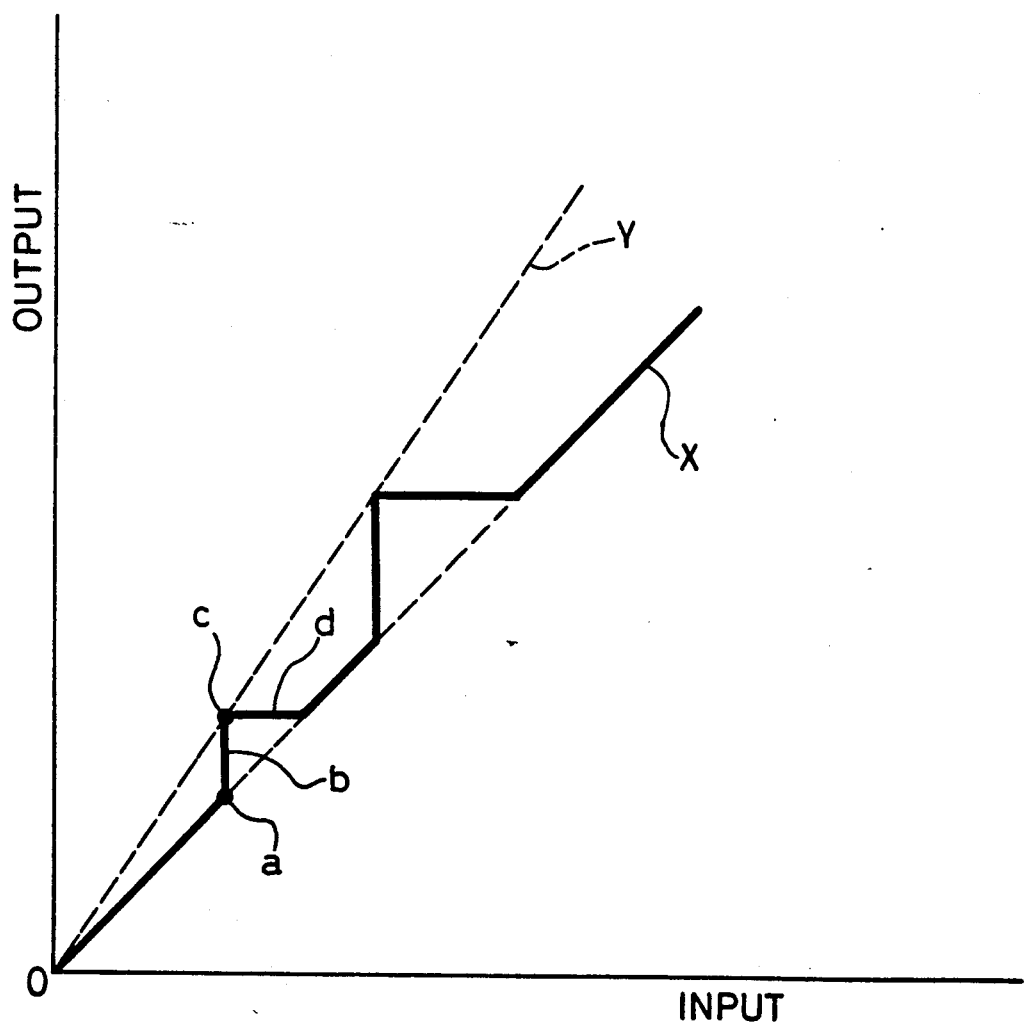
FIG. 2 graphically illustrates a response obtained with the present invention.

When the pressure fluid is introduced into the first power chamber 13, such hydraulic pressure acts upon a pressure responsive area $A_1$ of the first piston 6 while a driver senses a brake reaction which corresponds to a cross-sectional area B of the input shaft 10. Accordingly, the boosting ratio is equal to $A_1/B$ in this instance, which is graphically shown as a straight line X in FIG. 2.

Subsequently, the hydraulic pressure introduced into the first power chamber 13 is then introduced into the second power chamber 75 as retarded through its passage through the orifice 79, and when the resulting pressure becomes equal to the pressure within the first power chamber 13, the resulting boosting ratio will be equal to $A_2/B$ ($A_2 > A_1$) depending on the pressure responsive area $A_2$ of the second piston 7. The resulting boosting ratio is graphically shown as a straight line Y in FIG. 2.

In other words, upon depression of a brake pedal, the hydraulic pressure within the first power chamber 13 rises immediately, and accordingly the output from the hydraulic pressure booster will rise with the boosting ratio as illustrated by the straight line X. If the brake pedal ceases to be depressed at point a on the line X, the hydraulic pressure within the second power chamber 75 will rise in retarded manner, and hence the output will rise as indicated by a straight line b. When the hydraulic pressure within the second power chamber 75 becomes equal to the hydraulic pressure within the first power chamber 13, the output ceases to increase at point c on the straight line Y.

It will, therefore, be seen that upon actuation of the brake, the output continues to increase slightly (to point c) beyond a brake output (point a) which obtains when the brake pedal ceases to be depressed, thus imparting a brake feeling which is favorable to a driver.

Additionally, if the brake pedal is again depressed at the point c. the input and output increase at the same magnitude without accompanying a pressure increase within the second power chamber 75 or without any increase in the output (as illustrated by a straight line d in FIG. 2) even though this depends upon the rate of depression of the brake pedal, and subsequently the output again increases along the line X.

On the other hand, when the brake pedal is released, the hydraulic pressure in the second power chamber 75 is immediately exhausted to the first power chamber 13 through the check valve 80, thus allowing the hydraulic pressure in the both power chambers 13, 75 to be reduced rapidly, preventing any dragging effect of the brake.

Alternatively, the orifice 79 may be replaced by a variable orifice to allow a fine tuning of the brake feeling as desired by a driver.

While the invention has been illustrated and described above in connection with an embodiment thereof, it should be understood that a number of changes, modifications and substitutions therein will readily occur to one skilled in the art from the above disclosure without departing from the spirit and scope of the invention defined by the appended claims.

What is claimed is:

1. A hydraulic pressure booster comprising a first piston of a smaller diameter and a second piston of a greater diameter which are disposed in a housing so as to be reciprocable in a common direction and which are disposed in abutment against each other, a first power chamber formed in one free end of the first piston, a second power chamber formed in the other end of the first piston which is disposed for abutment against the second piston, a communication passage providing a communication between the first and the second power chambers, and a control valve adapted to be operated as a result of a mechanical connection with an input shaft for introducing a hydraulic pressure into the first power chamber having a magnitude which depends on the magnitude of an input force applied to the input shaft to thereby drive the first piston forward, the hydraulic pressure introduced into the first power chamber being introduced into the second power chamber through the communication passage; wherein an orifice, which retards the introduction of the hydraulic pressure from the first to the second power chamber, and a check valve which allows a flow of a pressure fluid from the second to the first chamber are connected in shunt with each other in the communication passage.

2. A hydraulic pressure booster according to claim 1, further including an accumulator connected to the communication passage at a point nearer the second power chamber than the orifice and the check valve.

3. A hydraulic pressure booster according to claim 1, further including a reservoir communicating, through a second check valve, to the communication passage at a point nearer the second power chamber than the orifice and the check valve, the second check valve allowing a flow of a pressure fluid from the reservoir to the communication passage.

4. A hydraulic pressure booster according to claim 1 in which the orifice comprises a variable orifice.

* * * * *